(12) United States Patent
Sundine (10) Patent No.: US 9,022,364 B2
(45) Date of Patent: May 5, 2015

(54) EVAPORATIVE SYSTEM FOR REMOVING WATER FROM AN AIRCRAFT LAVATORY AND OR GALLEY FLOOR

(71) Applicant: The Boeing Company, Chicago, IL (US)

(72) Inventor: Craig P. Sundine, Chicago, IL (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/906,062

(22) Filed: May 30, 2013

(65) Prior Publication Data

US 2014/0353855 A1 Dec. 4, 2014

(51) Int. Cl.
*B01F 3/04* (2006.01)
*C02F 1/10* (2006.01)
*B64D 11/02* (2006.01)
*B64D 11/04* (2006.01)

(52) U.S. Cl.
CPC ............... *C02F 1/10* (2013.01); *B01F 3/04099* (2013.01); *B64D 11/02* (2013.01); *B64D 11/04* (2013.01)

(58) Field of Classification Search
CPC .......... B01F 3/04; B01F 3/04099; C02F 1/02; C02F 1/10

USPC ............................... 261/76, 119.1, 142; 4/665
See application file for complete search history.

(56) References Cited

U.S. PATENT DOCUMENTS

| | | | |
|---|---|---|---|
| 2,396,992 A | 3/1946 | Randolph | |
| 4,165,545 A | 8/1979 | Stoltzfus | |
| 5,857,228 A | 1/1999 | Waltenberger et al. | |
| 5,903,937 A | 5/1999 | Clarke | |
| 7,767,359 B2 * | 8/2010 | Hoffjann et al. | 429/513 |
| 7,854,852 B1 * | 12/2010 | Reavis | 210/767 |
| 2011/0258769 A1 | 10/2011 | Savignac | |

FOREIGN PATENT DOCUMENTS

| | | |
|---|---|---|
| EP | 0031311 A2 | 1/1981 |
| EP | 2148017 | 1/2010 |
| WO | WO 2006/004333 | 1/2006 |

* cited by examiner

*Primary Examiner* — Robert A Hopkins
(74) *Attorney, Agent, or Firm* — Weiss & Moy, P.C.

(57) ABSTRACT

A system for removing gray water from a lavatory or galley area has a container positioned in a floor of the lavatory or the galley. A conduit is provided in flow communication with the container. The conduit is coupled to a ventilation device configured to generate an air flow in the conduit to evaporate the gray water collected in the container.

20 Claims, 7 Drawing Sheets

EVAPORATIVE SYSTEM FOR REMOVING WATER FROM AN AIRCRAFT LAVATORY AND OR GALLEY FLOOR

BACKGROUND

Embodiments of this disclosure relate generally to aircraft systems, and more particularly, to an evaporative system and method for removing gray water from an aircraft floor.

In most commercial aircraft, waste water and material tend to accrue during the flight. The waste water often includes leftover portions of beverages served to the passengers, water from the lavatory, and so forth. One form of waste water is gray water. Gray water is "used" water that drains from drinking water systems, from wash basins during hand washing, material poured down a galley sink, or any other instance in which water is soiled or loaded with waste (e.g., soaps, detergents, soils from hand washing). Gray water does not include contaminants such as toilet waste which is generally referred to as black water.

Most commercial aircraft may be equipped with a gray water system and a waste water system for collecting, storing and ultimately disposing of gray water and black water. For example, in some aircraft, black water is vacuumed away to a waste tank on the aircraft, and gray water is vacuumed away to the same tank or discharged out of the airplane via specially designed and located drain masts made for that purpose.

In the case where the gray water is discharged outside the aircraft, a mast drain extends from a fuselage of the aircraft to eject the gray water from the aircraft. However, the mast drain includes associated plumbing throughout the aircraft and may limit positioning of monuments, such as lavatories, within a cabin of the aircraft. As such, some aircraft may omit the mast drain and collect both grey water and black water in the on-board tank. However, the associated plumbing for channeling the grey water and black water to the tank may be difficult to tap into, depending on the position of the monuments. Accordingly, lavatories on such aircraft generally do not include floor drains.

Therefore, it would be desirable to provide a system and method that overcomes the above.

SUMMARY

A system for removing gray water from a lavatory or galley area has a container positioned in a floor of the lavatory or the galley. A conduit is provided in flow communication with the container. The conduit is coupled to a ventilation device configured to generate an air flow in the conduit to evaporate the gray water collected in the container.

A system for removing gray water from a lavatory or galley area has a floor having a first edge and a second edge. The floor slopes downwardly towards the second edge. A container is defined in the floor adjacent the second edge of the floor. A conduit is provided in flow communication with the container. The conduit provides an air flow to evaporate the gray water collected in the container.

A method for removing gray water from a lavatory comprises: sloping a floor from a first edge down to a second edge; positioning a container within the floor and adjacent the second edge of the floor; and directing an air flow from a ventilation system towards the container to evaporate the gray water within the container.

The features, functions, and advantages may be achieved independently in various embodiments of the disclosure or may be combined in yet other embodiments.

BRIEF DESCRIPTION OF THE DRAWINGS

Embodiments of the disclosure will become more fully understood, from the detailed description and the accompanying drawings, wherein.

DETAILED DESCRIPTION

Figure 1:
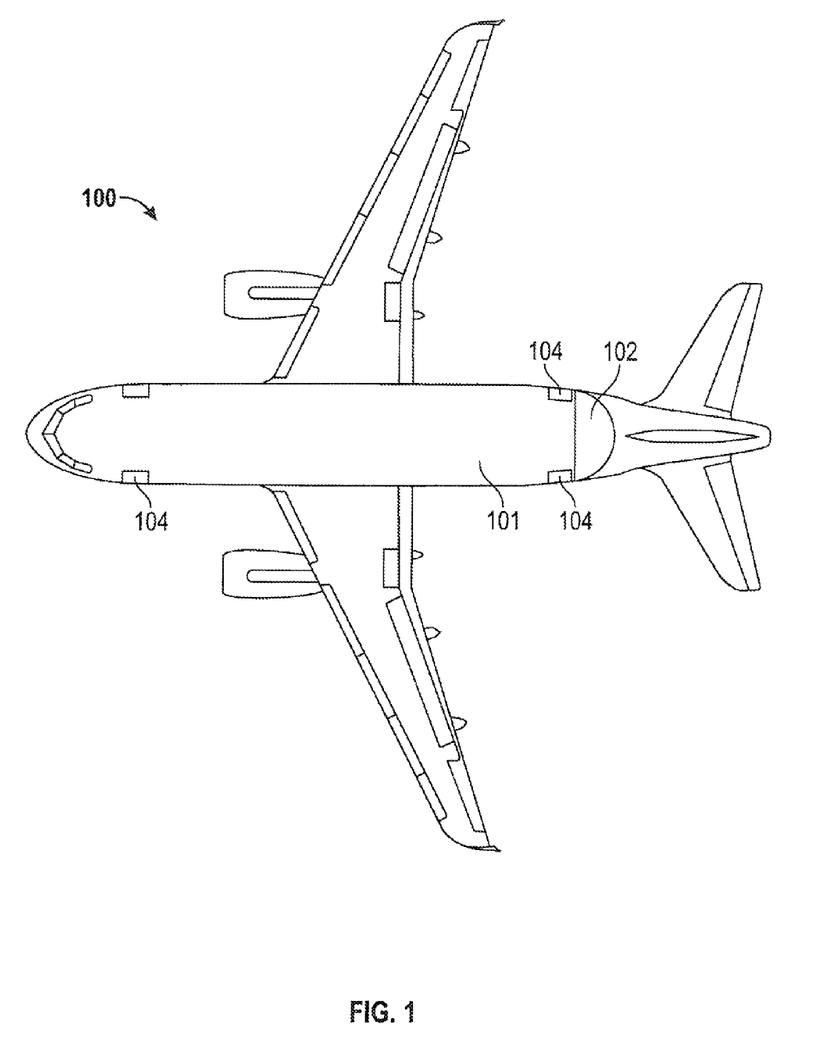
FIG. 1 is a top view of an aircraft illustrating areas where the evaporative system for removing water may be installed.

Referring now to FIG. 1, an aircraft 100 is shown. In a cabin area 101 of the aircraft 100 may have one or more galley areas 102. The galley areas 102 may be used by aircraft personnel to prepare and serve food, beverages and other items. The aircraft 100 may also have one or more lavatories 104. The galley area 102 and lavatories 104 may produce gray water from sources such as galley sinks, lavatory sinks, drinking water systems, and the like. The galley area 102 and lavatories 104 may have other fixtures and/or devices that produce gray water without departing from the spirit and scope.

Often, gray water may build up on the floor of the galley area 102 and lavatories 104 due to water spilling from the lavatory and/or galley sinks during hand washing, water spilling from a drinking water system, or any other instance. In some aircraft, it may be difficult to install a floor drain in the galley area 102 and lavatories 104 to remove gray water which may accumulate on the floor of the galley area 102 and/or lavatories 104. This may be due to limited space for the associated plumbing for channeling the grey water, a lack of a drain mast in the aircraft or the like.

Figure 2:
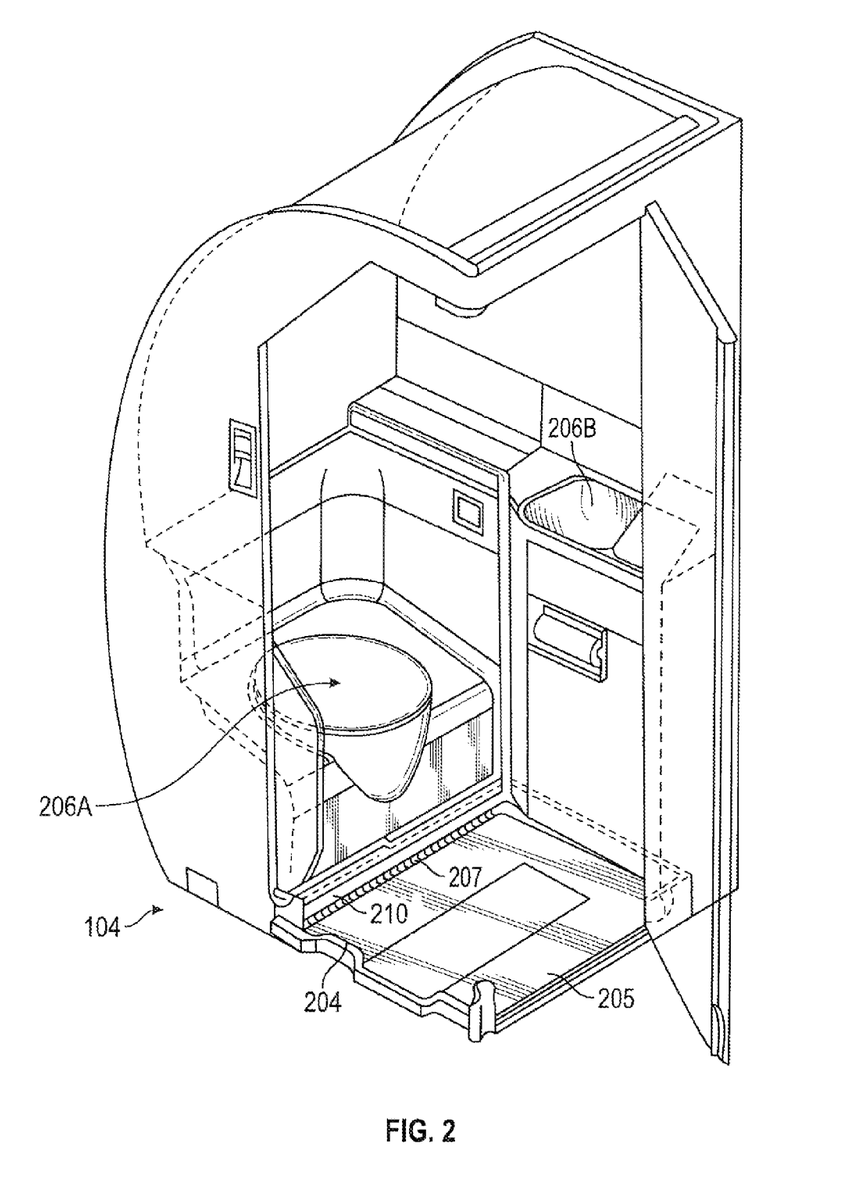
FIG. 2 illustrates a lavatory area of the aircraft of FIG. 1 implementing the evaporative system for removing water.
Figure 3:
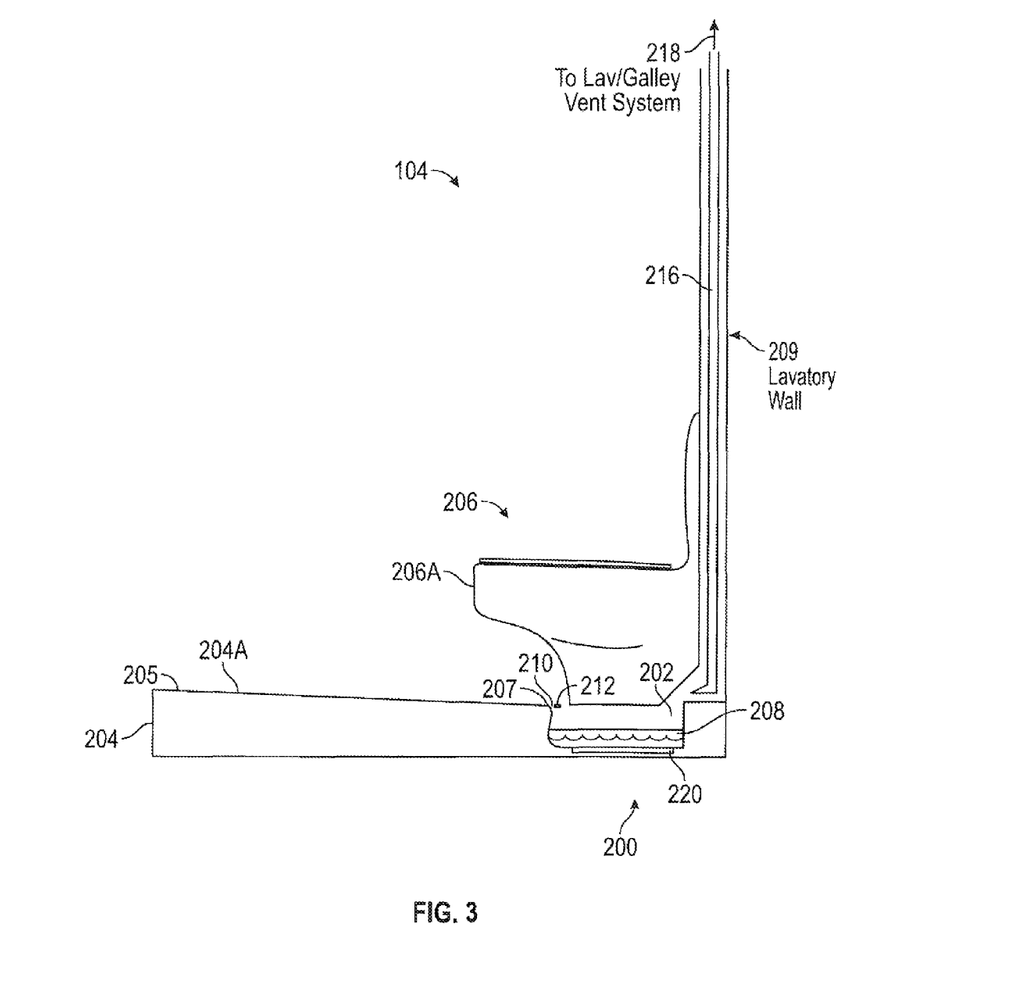
FIG. 3 illustrates a cross-sectional view of the lavatory area of FIG. 2 implementing the evaporative system for removing water.
Figure 4:
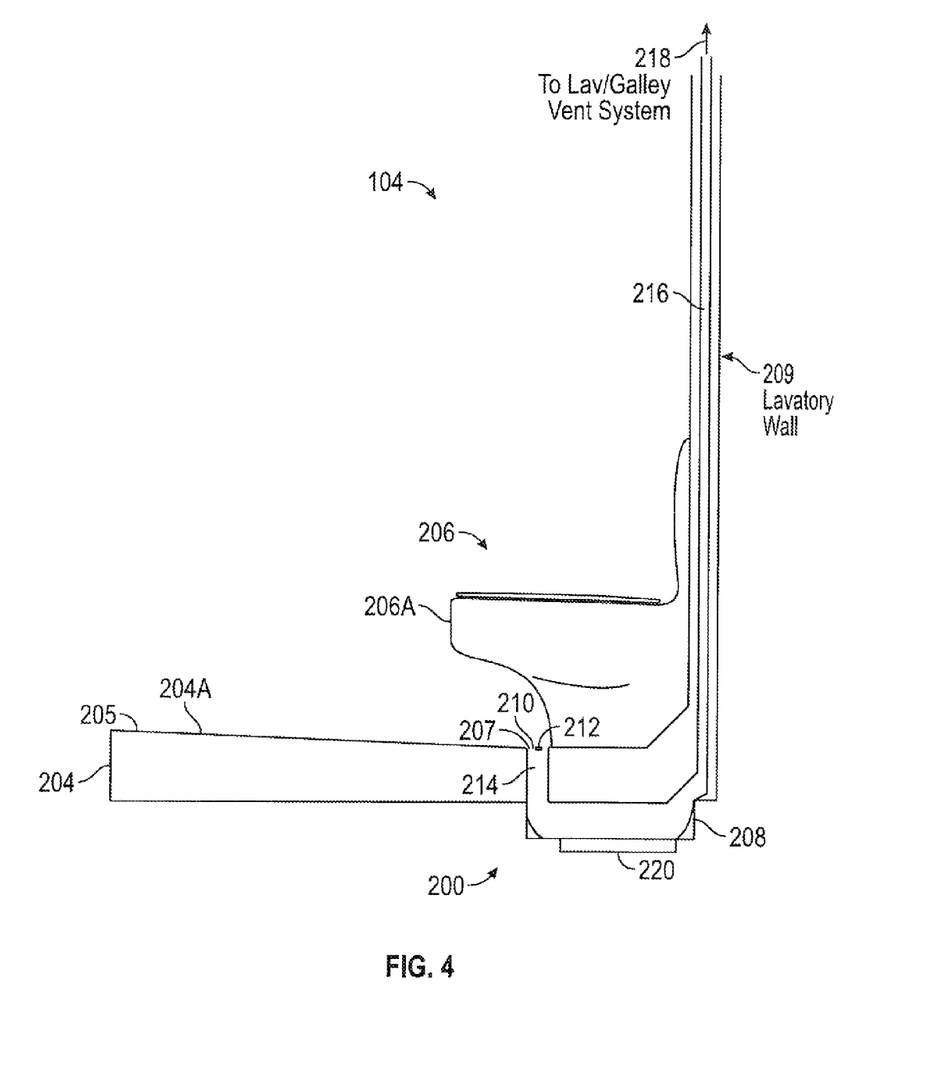
FIG. 4 illustrates a cross-sectional view of the lavatory area of FIG. 2 implementing another embodiment of the evaporative system for removing water.

Referring now to FIGS. 2-4, a system 200 for removing gray water that may build up on the floor structure 204 of the galley area 102 and or lavatories 104 is shown. As shown in the embodiment of FIG. 2-4, the system 200 is implemented in a lavatory 104 of an aircraft 100 (FIG. 1). In the system 200 a void area 202 is formed within the floor structure 204. The void area 202 may be formed adjacent a water fixture 206 since the water fixture 206 may be the main source of the gray water that may build up on the floor structure 204. In the present embodiment, the void area 202 is formed partially around a commode 206A. However, the void area 202 may be formed around a sink 206B or in other areas in the floor structure 204 of the lavatory 104.

The void area 202 may be formed in different shapes and or sizes. The void area 202 may be used as a holding area for storing gray water that has built up on the floor structure 204 of the lavatory 104. Alternatively, the void area 202 may be sized and shaped to accommodate a container 208. The container 208 may be positioned within the void area 202. The container 208 may be used to collect gray water and or other fluids that may collect on the floor structure 204 of the lavatory 104.

The container 208 may also be sized and shaped to accommodate for positioning within the void area 202. For example, in the present embodiment, the container 208 is positioned around the commode 206A. Thus, the container 208 may be shaped to accommodate the piping associated with the installation of the commode 206A. For example, the container may be "U" or "O" shaped and positioned partially or totally around a circumference of the commode 206A.

In the present embodiment, the commode 206A is positioned adjacent the container 208 such that a gap 210 is formed between the commode 206A and a top surface 204A of the floor structure 204. The gap 210 acts as a floor drain to allow gray water to flow into the container 208. A screen 212 may be positioned over the gap 210. The screen 212 may be used to prevent objects other than the gray water from accumulating in the container 208.

In accordance with another embodiment of the present invention, instead of forming the void area 202 within the floor structure 204, the container 208 may be positioned underneath the floor structure 204 of the lavatory 104 as shown in FIG. 4. In this embodiment, one or more channels 214 may be formed through the floor structure 204. The channels 214 may be used to allow the gray water or other fluids on the top surface 204A of the floor structure 204 to flow to the container 208. As in the previous embodiment, a screen 212 may be positioned over the channel 214. The screen 212 may be used to prevent objects other than the gray water from accumulating in the container 208.

To aid in the collection of the gray water and/or other fluids into the container 208 the top surface 204A of the floor structure 204 may be angled towards the gap 210 and/or channel 214. The angle of the top surface 204A of the floor structure 204 should be sufficient to allow gray water or other fluids on the top surface 204A of the floor structure 204 to flow towards and into the gap 210 and or channel 214 such that the gray water or other fluids may be collected in the container 208. However, the angle of the top surface 204A of the floor structure 204 should not be so steep as to make it uncomfortable and/or difficult for a person to stand. In the present embodiment, the top surface 204A of the floor structure 204 is angled from a first edge 205 to a second edge 207 wherein the second edge 207 is adjacent the gap 210 and/or channel 214.

The system 200 may use a conduit 216 to provide a means for ventilating the air around the container 208. The conduit 216 may be positioned within a wall 209 of the lavatory 104 and attached to a ventilation system 218 of the aircraft 100 (FIG. 1). A conduit like structure may also be formed as an integral part of the lavatory 104. In the present embodiment, the conduit 216 may be coupled to an existing ventilation system 218 in the lavatory 104 of the aircraft 100. The ventilation system 218 may allow airflow to evaporate and transport the moist air out of the container 208 and hence the lavatory 104. In general, the ventilation system 218 is always turned on during a flight thereby allowing for continuous evaporation and transport of gray water which may accumulate in the container 208.

In accordance with one embodiment, a heating device 220 may be used to heat the container 208. The heating device 220 may be used to increase the evaporation rate of the gray water in the container 208. The ventilation system 218 may still be used allow airflow to further evaporate and transport the moist air out of the container 208 and hence the lavatory 104. The heating device 220 may be warm enough to increase the evaporation rate but not warm enough to be a fire hazard.

Figure 5:
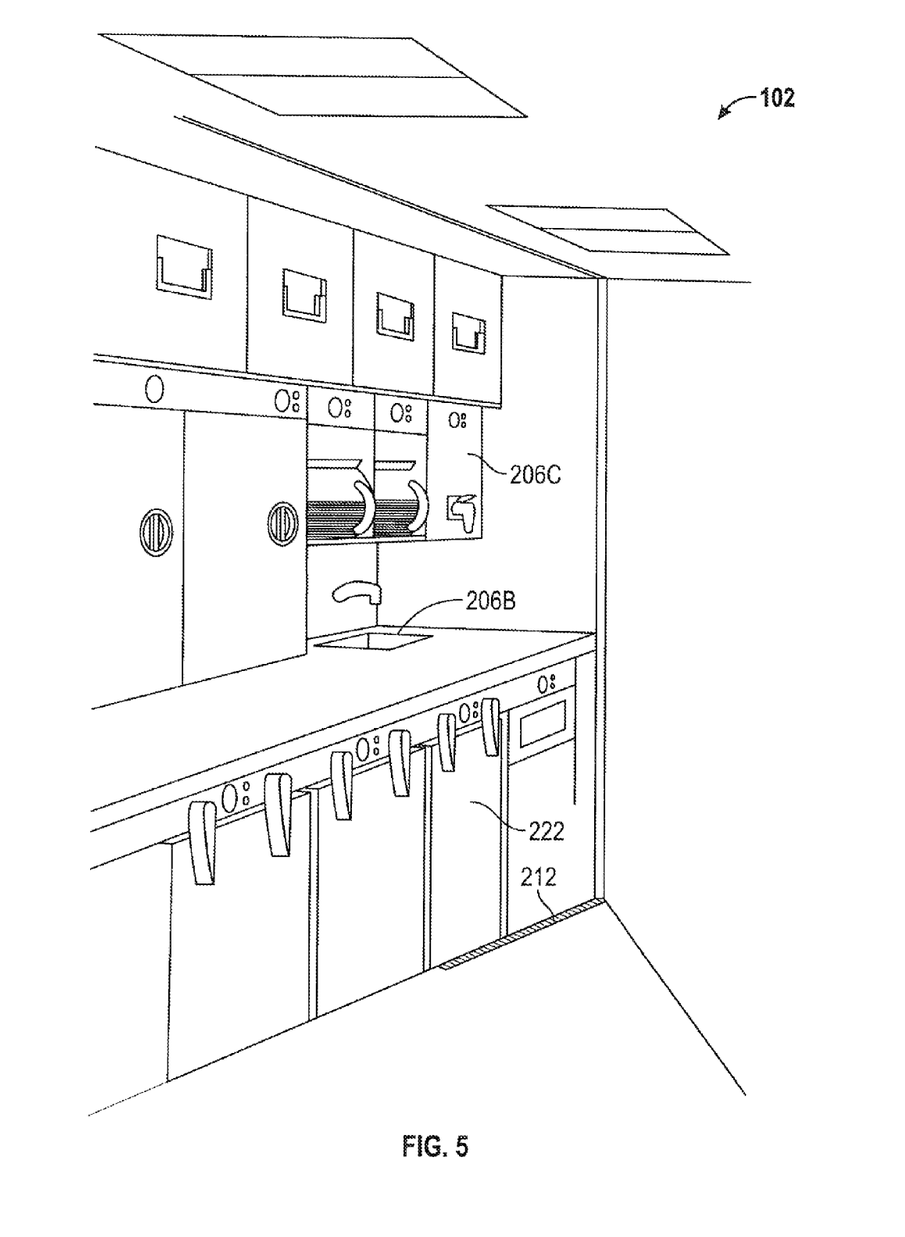
FIG. 5 illustrates a galley area of the aircraft of FIG. 1 implementing the evaporative system for removing water
Figure 6:
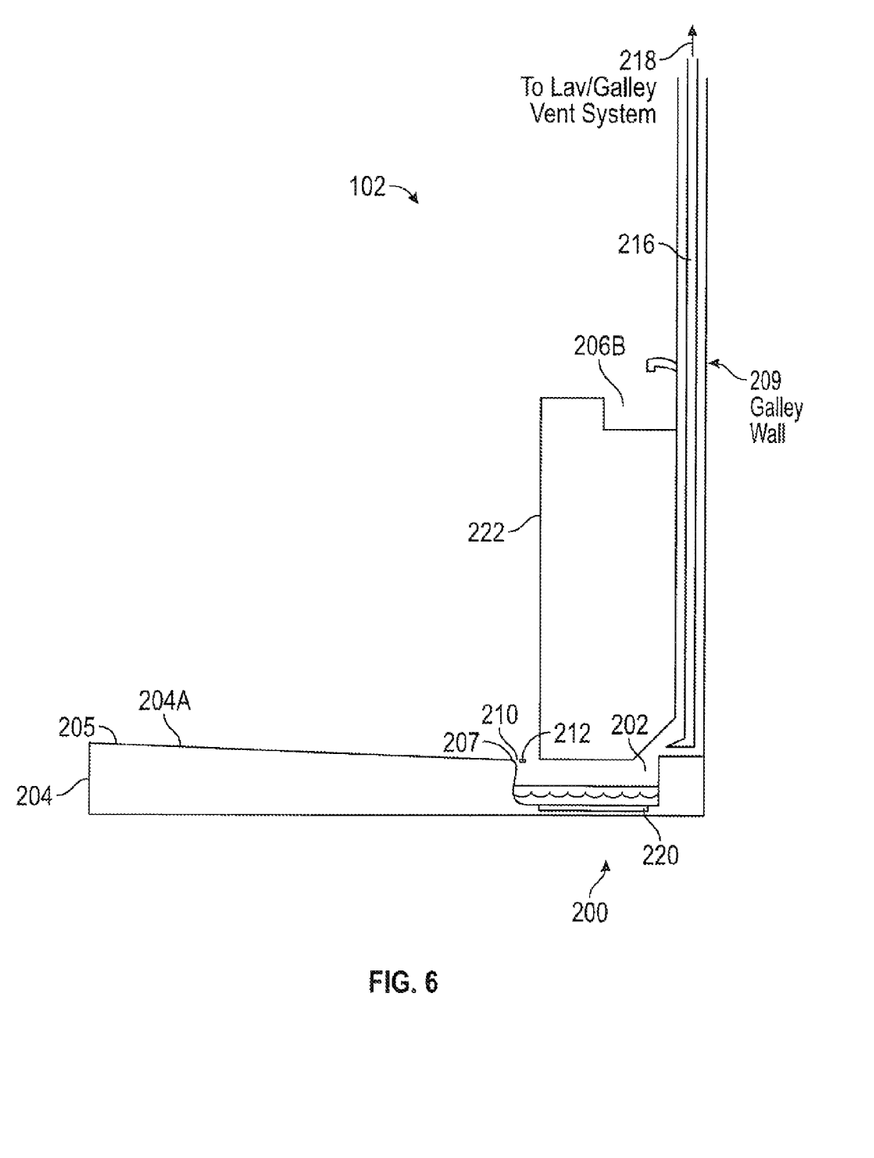
FIG. 6 illustrates a cross-sectional view of the galley area of FIG. 5 implementing the evaporative system for removing water.
Figure 7:
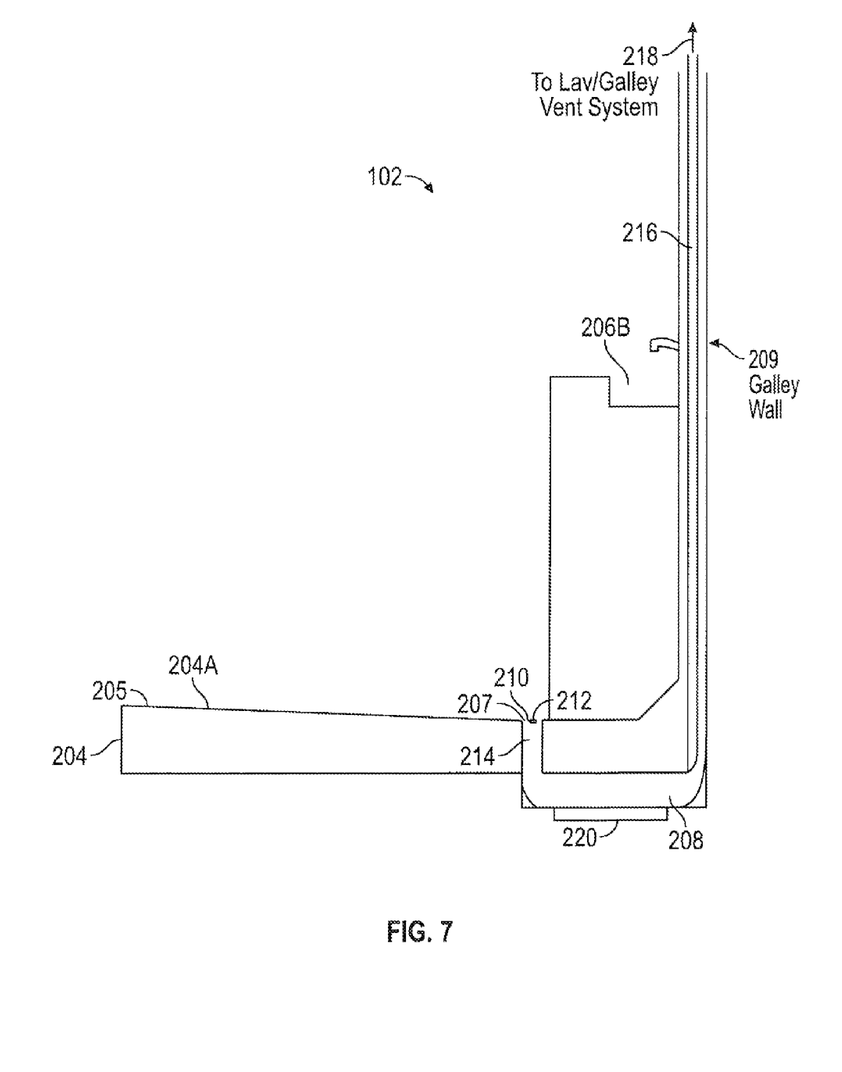
FIG. 7 illustrates a cross-sectional view of the galley area of FIG. 5 implementing another embodiment of the evaporative system for removing water.

Referring to FIGS. 5-7, the system 200 is shown in a galley area 102 of an aircraft 100 (FIG. 1). The galley area 102 may have multiple water fixtures 206. For example, the galley area 102 may have a sink 206B, a drinking water system 206C or the like. Other water fixtures 206 may be in the galley area 102 without departing from the spirit and scope.

The system 200 in the galley area 102 is similar to that in the lavatory 104. A void area 202 may be formed within the floor structure 204. The void area 202 may be formed adjacent the water fixture 206. In the present embodiment, the void area 202 is formed adjacent the sink 206B and drinking water system 206C. However, the void area 202 may be formed adjacent a sink 206B or in other areas in the floor structure 204 of the galley area 102.

The void area 202 may be formed in different shapes and or sizes. The void area 202 may be used as a holding area for storing gray water that has built up on the floor structure 204 of the galley 102. Alternatively, the void area 202 may be sized and shaped to accommodate a container 208. The container 208 may be positioned within the void area 202. The container 208 may be used to collect gray water and or other fluids that may collect on the floor structure 204 of the galley area 102.

The container 208 may also be sized and shaped to accommodate for positioning within the void area 202. For example, in the present embodiment, the container 208 is positioned adjacent the sink 206B and drinking water system 206C. The container 208 may be shaped to accommodate the piping associated with the installation of the sink 206B and drinking water system 206C.

In the present embodiment, cabinetry 222 supporting the sink 206B is positioned adjacent the container 208 such that a gap 210 is formed between the cabinetry 222 and a top surface 204A of the floor structure 204. The gap 210 acts as a floor drain to allow gray water to flow into the container 208. A screen 212 may be positioned over the gap 210. The screen 212 may be used to prevent objects other than the gray water from accumulating in the container 208.

In accordance with another embodiment of the present invention, instead of forming the void area 202 within the floor structure 204, the container 208 may be positioned underneath the floor structure 204 of the galley area 102 as shown in FIG. 7. In this embodiment, one or more channels 214 may be formed through the floor structure 204. The channels 214 may be used to allow the gray water or other fluids on the top surface 204A of the floor structure 204 to flow to the container 208. As in the previous embodiment, a screen 212 may be positioned over the channel 214. The screen 212 may be used to prevent objects other than the gray water from accumulating in the container 208.

To aid in the collection of the gray water and or other fluids into the container 208 the top surface 204A of the floor structure 204 may be angled towards the gap 210 and or channel 214. The angle of the top surface 204A of the floor structure 204 should be sufficient to allow gray water or other fluids on the top surface 204A of the floor structure 204 to flow towards and into the gap 210 and or channel 214 such that the gray water or other fluids may be collected in the container 208. However, the angle of the top surface 204A of the floor structure 204 should not be so steep as to make it uncomfortable and or difficult for a person to stand.

The system 200 may use a conduit 216 positioned within a wall 209 of the galley 102 to provide a means for ventilating the air around the container 208. A conduit like structure may also be formed as an integral part of the galley 102. The conduit 216 may be attached to a ventilation system 218 of the aircraft 100. In the present embodiment, the conduit 216 may be coupled to an existing ventilation system 218 in the galley area 102 of the aircraft 100. The ventilation system 218 may allow airflow to evaporate and transport of the moist air out of the container 208 and hence the galley area 102. In general, the ventilation system 218 is always turned on during a flight thereby allowing for continuous evaporation and transport of gray water which may accumulate in the container 208.

In accordance with one embodiment, a heating device 220 may be used to heat the container 208. The heating device 220 may be used to increase the evaporation rate of the gray water in the container 208. The ventilation system 218 may still be used to allow airflow to further evaporate and transport the moist air out of the container 208 and hence the galley area 102.

While embodiments of the disclosure have been described in terms of various specific embodiments, those skilled in the art will recognize that the embodiments of the disclosure may be practiced with modifications within the spirit and scope of the claims.

What is claimed is:

1. A system for removing gray water from a lavatory or galley area comprising:
   a container positioned in a floor of the lavatory or the galley;
   a conduit in flow communication with the container, wherein the conduit is coupled to a ventilation system configured to generate an air flow in the conduit to evaporate the gray water collected in the container.

2. The system of claim 1, wherein the floor is sloped towards the container.

3. The system of claim 1, further comprising a void area formed within the floor, the container positioned within the void area.

4. The system of claim 3, further comprising a water fixture positioned adjacent the void area, wherein a gap is formed between the water fixture and the floor, the gap allowing the gray water to flow into the gap and down to the container.

5. The system of claim 4, further comprising a screen positioned over the gap.

6. The system of claim 1, further comprising a heating device to warm the container.

7. The system of claim 1, wherein the conduit is positioned within a wall of one of the lavatory or galley.

8. A system for removing gray water from a lavatory or galley area comprising:
   a floor having a first edge and a second edge, the floor slope downwardly towards the second edge;
   a container defined in the floor adjacent the second edge;
   a conduit in flow communication with the container, wherein the conduit provides an air flow to evaporate the gray water collected in the container.

9. The system of claim 8, further comprising a void area formed within the floor, the container positioned within the void area.

10. The system of claim 9, further comprising a water fixture positioned adjacent the void area.

11. The system of claim 10, wherein a gap is formed between the water fixture and the second edge of the floor, the gap in communication with the container.

12. The system of claim 10, wherein the water fixture is one of a commode, a sink, a drinking water supply or the like.

13. The system of claim 10, further comprising a screen positioned over the gap.

14. The system of claim 8, wherein the conduit is coupled to a ventilation system, the ventilation system configured to generate an air flow in the conduit to evaporate the gray water collected in the container.

15. The system of claim 8, wherein the conduit is positioned within a wall of one of the lavatory or galley.

16. The system of claim 8, further comprising a heating device to warm the container.

17. A method for removing gray water from a lavatory comprising:
   sloping a floor from a first edge down to a second edge;
   positioning a container within the floor and adjacent the second edge; and
   directing an air flow from a ventilation system towards the container to evaporate the gray water within the container.

18. The method of claim 17, further comprising:
   forming a void area in the floor, the container positioned within the void area; and
   positioning a water fixture adjacent the void area, wherein a gap is formed between the water fixture and the second edge of the floor.

19. The method of claim 17, further comprising heating the container.

20. The method of claim 17, further comprising positioning a conduit in flow communication with the container, wherein the conduit is coupled to the ventilation system configured to generate an air flow in the conduit to evaporate the gray water collected in the container.

* * * * *